United States Patent [19]

Hjelmner et al.

[11] 4,246,102
[45] * Jan. 20, 1981

[54] METHOD FOR SEPARATING POLLUTANTS FROM LIQUID

[75] Inventors: Ulf R. Hjelmnér, Nynäshamn; Hans F. Larsson, Vasterhaninge, both of Sweden

[73] Assignee: Rederiaktíebolaget Nordstjernan, Stockholm, Sweden

[*] Notice: The portion of the term of this patent subsequent to Nov. 20, 1995, has been disclaimed.

[21] Appl. No.: 855,323

[22] Filed: Nov. 28, 1977

[30] Foreign Application Priority Data

Nov. 29, 1976 [SE] Sweden .............................. 76133677

[51] Int. Cl.³ ............................................. B01D 23/24
[52] U.S. Cl. .................................. 210/704; 210/96.1; 210/723; 210/739; 210/765; 210/786; 210/793; 210/798
[58] Field of Search ..................... 210/77, 33, 80, 82, 210/189, 19, 268, 274, 275, 285, 20, 49, 276, 74, 96.1; 23/270 R

[56] References Cited

U.S. PATENT DOCUMENTS

| | | | |
|---|---|---|---|
| 3,151,187 | 9/1964 | Comte | 210/268 |
| 3,545,619 | 12/1970 | Ettlich et al. | 210/275 |
| 3,968,034 | 7/1976 | Tymoszczuk | 210/275 |
| 4,060,484 | 11/1977 | Austin et al. | 210/80 |
| 4,126,546 | 11/1978 | Hjelmner et al. | 210/80 |

FOREIGN PATENT DOCUMENTS

| | | | |
|---|---|---|---|
| 453684 | 12/1927 | Fed. Rep. of Germany | 210/189 |
| 721643 | 6/1942 | Fed. Rep. of Germany | 210/189 |
| 2071027 | 9/1971 | France | 210/20 |
| 1200364 | 7/1970 | United Kingdom | 210/20 |

*Primary Examiner*—Benoit Castel
*Attorney, Agent, or Firm*—Brumbaugh, Graves, Donohue & Raymond

[57] ABSTRACT

In the particular embodiment of the invention described in the specification, a liquid to be purified passes first through a screen, a sand trap, a first sedimentation basin, an aeration basin and a second sedimentation basin, and then through a final purification step for chemical admixture and passage upwardly through a particulate filter bed. The particulate filter material is circulated continuously from the bottom of the filter bed through a washing device and the cleaned particulate material is deposited at the top of the filter bed. Sludge collected from the sedimentation basins and the washing device is treated in thickeners and digesters.

13 Claims, 4 Drawing Figures

METHOD FOR SEPARATING POLLUTANTS FROM LIQUID

BACKGROUND OF THE INVENTION

In most municipal and many industrial water treatment processes, water must be subjected to precipitation and/or flocculation in a purification step in the separation process in order to obtain complete and effective removal of the pollutants from the water. Conventional chemical purification includes one or more flocculation tanks provided with stirrers or agitators followed by one or more sedimentation basins through which the water passes after addition of chemicals. A disadvantage of conventional chemical purification processes is the large area required for the flocculation tanks and sedimentation basins. A further disadvantage of conventional chemical purification techniques is the long time required for the water to remain in the flocculation tank as well as the sedimentation basin.

Furthermore, the use of flocculation tanks and sedimentation basins alone in the chemical purification step does not result in a high enough water purity for many applications. In such cases, a sand filter is added at the end of the purification step to increase the purity of the water being treated. The sand in such sand filters, however, must be cleaned by back-washing at frequent intervals and, in order to avoid shutting down the purification step, it is necessary to provide at least two sand filters, one of which is in use while the other is being backwashed.

It is an object of this invention to avoid the above-mentioned disadvantages of conventional purification steps.

SUMMARY OF THE INVENTION

The present invention, which is applicable not only to the above-mentioned water treatment processes but also to other liquid treatment processes, relates to a method for separating pollutants from a liquid having a purification step in which chemicals are added to the liquid being treated for precipitation and/or flocculation and separation in the purification step. In accordance with the invention, the liquid being treated with chemicals is supplied to and flows continuously through a bed or zone of particulate filter material during precipitation and/or flocculation and the particulate filter material is continuously cleaned during the purification step. In a particular embodiment of the invention, the water being treated, following addition of chemicals, passes upwardly through a filter bed containing a particulate material such as sand, and the purified water is withdrawn from the top of the filter bed. At the same time, the particulate filter material is withdrawn continuously from the bottom of the filter bed and, after being washed by purified water from the top of the filter bed, the particulate material is deposited at the top of the filter bed.

By using the invention, it is possible to reduce the volume of liquid retained in the purification step to about one-tenth that required for conventional processes, thereby reducing the area required for that step and increasing the rate at which liquid passes through the purification step. In this regard, the time required to obtain the same degree of purification by conventional techniques is about ten to fifteen times as great as is required for the present invention. Moreover, compared with conventional techniques using flocculation tanks and sedimentation basins, considerably higher purity can be obtained; at least as high as with those techniques requiring two or more sand filters which, as described above, must be back-washed alternately and at frequent intervals. In addition, further flocculation, or floc growth, takes place in the discharged wash liquid, facilitating separation of the flocculating material. Because the particulate filter material is washed and returned to the filter bed continuously according to the invention, the filter material can accept a liquid which is quite dirty and/or contains considerable precipitation without any need for shutting off the filter bed for the purpose of back-washing.

In a preferred method according to the invention, the liquid to be filtered flows in an upward direction through the filter bed during filtration and the particulate filter material passes in a downward direction through the filter bed during the filtration in counter-current to the liquid and past the inlet of the liquid to the filter bed. This method provides the advantage that the dirtiest filter material which has been in the filter bed for the longest time is removed from the bed for washing and, therefore, the particulate material first encountered by the liquid passing through the filter bed is material which has been in the filter bed for a considerable time. This avoids a further problem encountered in conventional filter beds which, as mentioned above, require back-washing in that newly washed filter material provides a poor filtration effect during a comparatively long time after washing, for instance, up to half an hour for sand. Furthermore, since the content of pollutants in the liquid to be purified often is high, requiring back-washing of conventional filter beds at more frequent intervals, the effectiveness of such filter beds is reduced because the decreased purification effect due to newly washed filter material is predominant.

Preferably, according to the invention, in order to obtain an increased precipitation and/or flocculation, the liquid to be treated containing chemical additives is homogenized before being introduced into the filter bed. In this way, the addition of chemicals to the liquid may take place just prior to the introduction of the liquid into the filter bed.

DETAILED DESCRIPTION

Further features and advantages of this invention will be apparent from the following detailed description taken in conjunction with the accompanying drawings, in which.

In the conventional sewage treatment plant illustrated schematically in FIG. 1, a dash-dot line L indicates the division between an upper separation part, having apparatus for carrying out the separation process in a selected number of process steps, indicated by the reference characters $P_{1-6}$, and a sludge treatment part, below the separation process, having apparatus for the treatment of sludge pollution in a selected number of steps, indicated by the reference characters $S_1$–$S_7$. An inlet for untreated sewage is designated by the letter I, an outlet for purified water produced by the separation process is designated by the letters OW and an outlet for sludge following the sludge treatment steps is designated by the letters OS.

Figure 1:
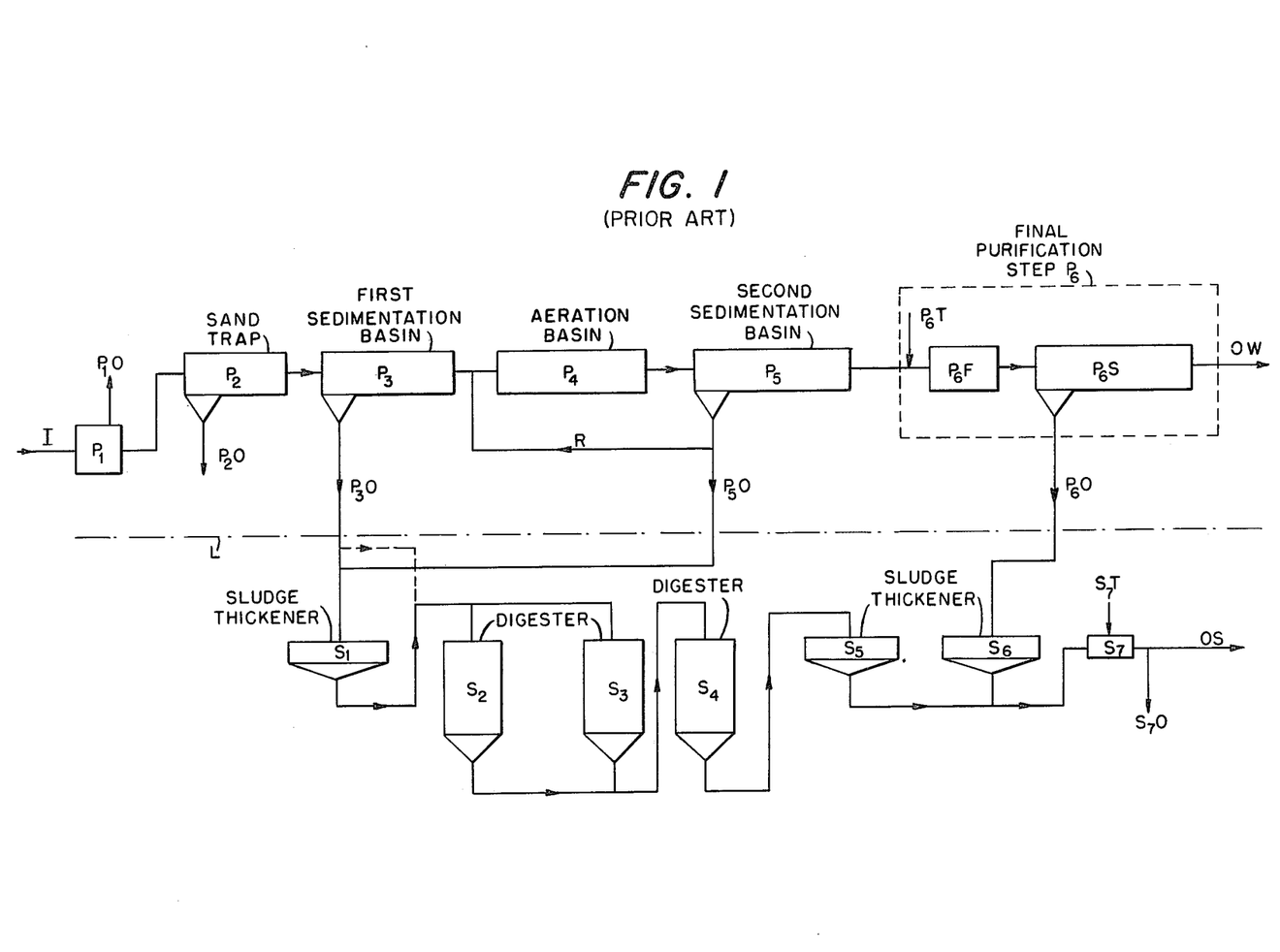
FIG. 1 is a schematic block diagram illustrating, by way of example, the arrangement of a conventional sewage treatment plant.

As shown schematically in FIG. 1, incoming sewage first passes a bar screen $P_1$, in which coarse or thick material, such as rags, is separated and removed as illustrated by the arrow $P_1O$. After passing the bar screen the sewage flows through a sand trap $P_2$, and sand scraped out of the sand trap is removed as illustrated by the arrow $P_2O$. The sewage then flows through a first sedimentation basin $P_3$, an aeration basin $P_4$ and a second sedimentation basin $P_5$ in that order, the sediment or sludge separated in the sedimentation basin $P_3$ being transferred to the sludge treatment part, as illustrated by the arrow $P_3O$. Usually, most of the sludge separated in the sedimentation basin $P_5$ is recirculated through the aeration basin $P_4$, as illustrated by the arrow R, and excess sludge is transferred to the sludge treatment part as shown by the arrow $P_5O$. The liquid is finally purified in a purification step $P_6$, which includes a chemical admixture $P_6T$, at least one flocculation tank $P_6F$ having agitators (not shown), and at least one sedimentation basin $P_6S$. Sludge discharged from the sedimentation basin $P_6S$ is transferred to the sludge treatment part, as illustrated by the arrow $P_6O$.

The sludge treatment part includes, as shown schematically a sludge thickener $S_1$, three digesters $S_2$, $S_3$ and $S_4$, two further sludge thickeners $S_5$ and $S_6$, and a centrifuge $S_7$ having a chemical admixture inlet $S_7T$ for flocculation and an outlet $S_7O$ for reject water. The sludge from the first sedimentation basin $P_3$ is supplied to the sludge treatment part, either to the sludge thickener $S_1$ or directly, as shown by the dashed line, to the first digester $S_2$. The sludge from the second sedimentation basin $P_5$ is suppied to the sludge thickener $S_1$ and the sludge from the final purification step is supplied to the sludge thickener $S_6$.

In a sewage treatment plan of the type shown in FIG. 1, having a final purification step $P_6$ with precipitation/flocculation in a flocculation tank and separation in a sedimentation basin, the discharged clarified water OW normally contains about 3–10 mg/l of suspended material. A higher purification efficiency can be obtained if a sand filter (not shown) is included in the final purification step after the sedimentation basin $P_6S$; however, as described above, at least two sand filters must be provided in most cases because of the necessity for shutting off and backwashing each sand filter. When using sand filters in that manner, it is possible to reduce the concentration of suspended material in the discharged clarified water to the range 0–2 mg/l.

Figure 2:
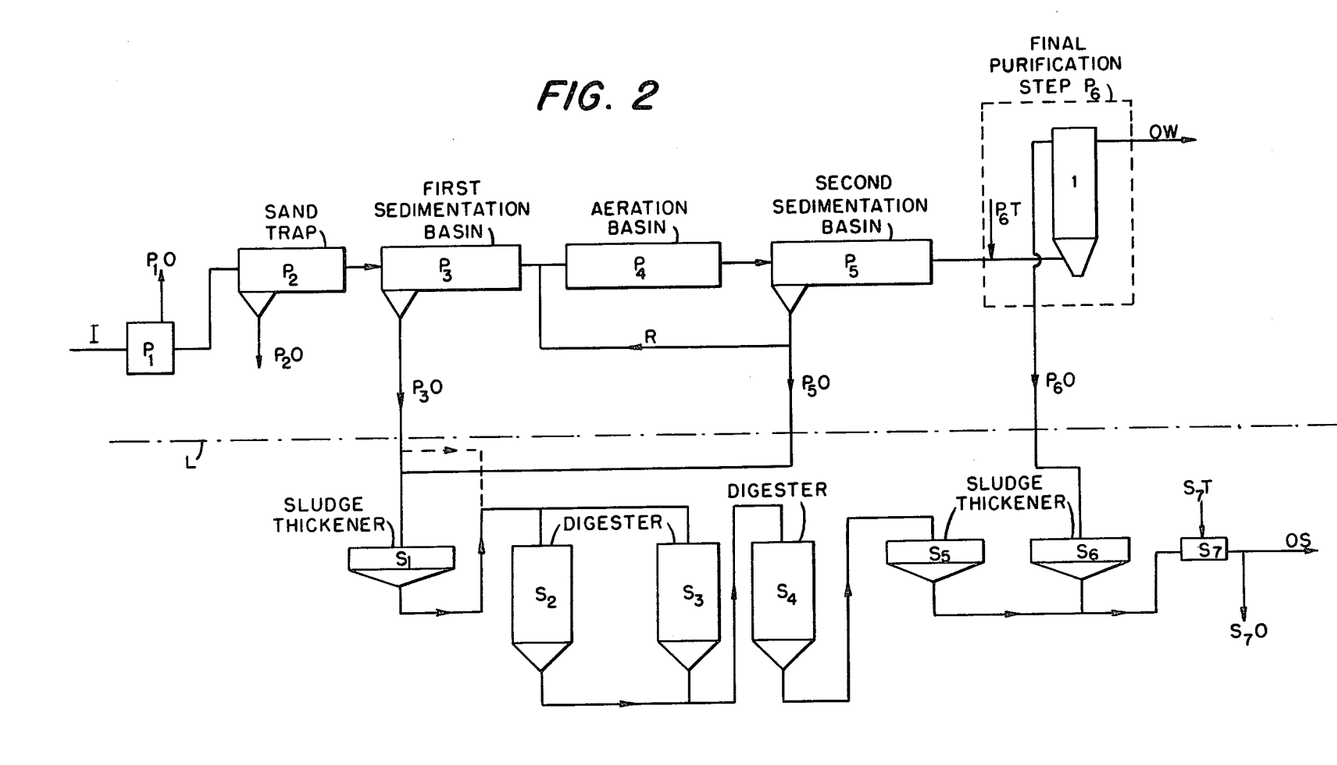
FIG. 2 is a schematic block diagram illustrating, by way of example, a liquid treatment plant of the type represented in FIG. 1, but utilizing a method according to this invention.
Figure 3:
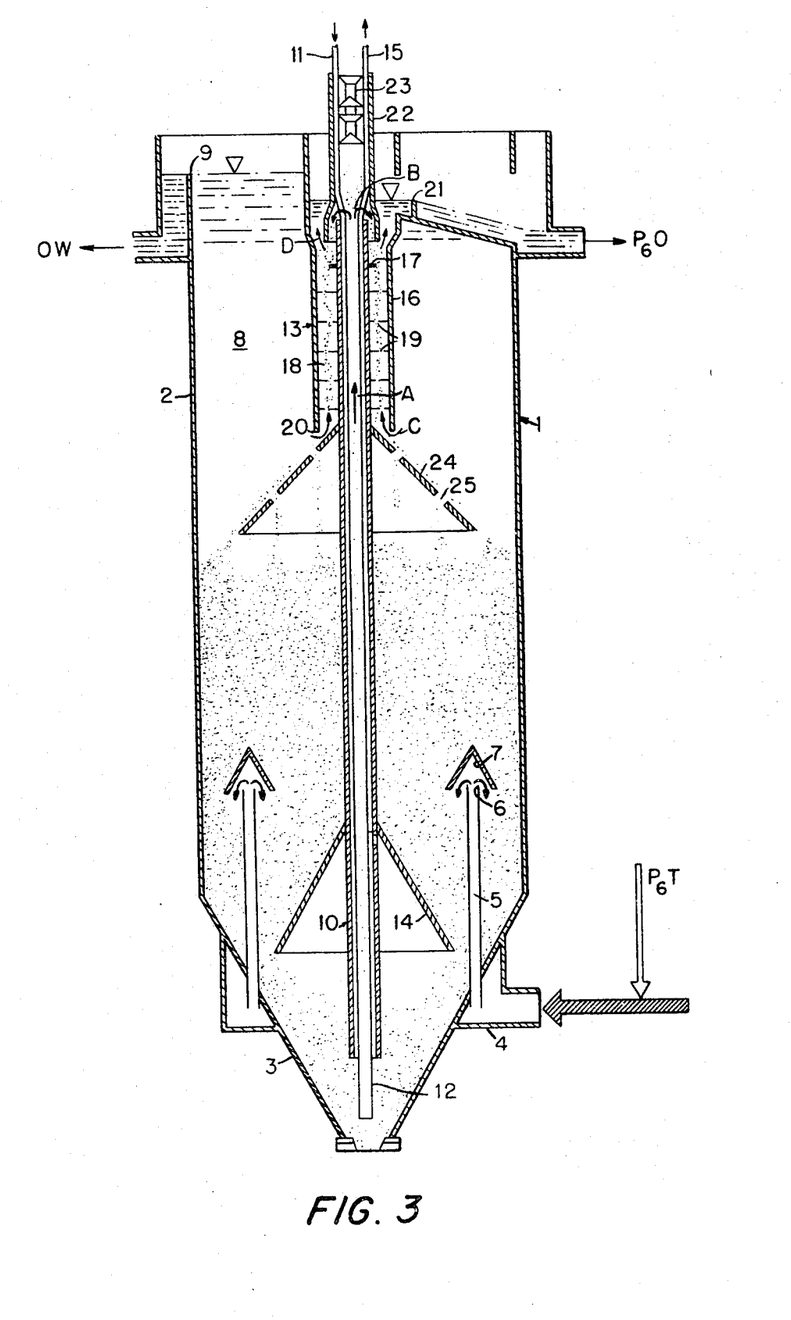
FIG. 3 is a view in vertical section illustrating a representative embodiment of a filtration apparatus arranged according to the invention and adapted to be used in the method of the invention illustrated in FIG. 2.

FIG. 2 illustrates schematically a sewage treatment plant of the type shown in FIG. 1 in which the final purification step $P_6$ in the separation process is arranged to carry out the method according to the present invention. In this regard, a continuously operating filtration apparatus 1 of bed filter type, described in greater detail hereinafter with reference to FIG. 3, is included in the final purification step following the chemical admixture $P_6T$. In the filtration apparatus 1, liquid to which chemicals are admixed is supplied to and flows continuously through a zone of particulate filter material forming the filter bed during precipitation/flocculation and separation. The continuous operation of the filter bed is such that, while filtration and discharge (arrow OW) of the water clarified by the filtration are going on, the filter material soiled by the filtration is transported to a washing process and the cleaned filter material is returned to the filter bed while the cleaning liquid soiled by the washing is discharged (arrow $P_6O$) from the purification step $P_6$.

Utilizing the method according to the invention results in a reduction of about 10 times in the volume of liquid required for the purification step compared with a conventional method according to FIG. 1 including a flocculation tank and a sedimentation basin. Moreover, improved purification is obtained during a considerably shorter maintenance time, about one-tenth to one-fifteenth the time required for conventional purification. The same purity, i.e., in the range 0–2 mg/l of suspended material in the clarified water, is obtained as when sand filters are added to the conventional purification step $P_6$ of FIG. 1.

As in conventional purifiers, chemicals are added for precipitation of hydroxides and phosphorous compounds in the liquid being purified. Usually aluminium sulphate is used as a chemical admixture but alternatively salts of, for instance, iron or calcium can be used. Aluminium hydroxides have a gel form, are porous, and have a large surface area, thereby providing a high capability for adsorbing pollutants. Moreover, they adhere extremely well to particulate filter materials. They are, at the same time, light, which contributes to a comparatively long maintenance time in sedimentation basins. In some instances, metal salts are found in industrial waste water. In those cases acid or caustic liquid can be added and, when the proper pH has been reached, precipitation/flocculation takes place in the particulate filter bed. If only flocculation is desired, organic polymers, for instance, can be added.

Although not illustrated in the drawings, it is appropriate to homogenize the fluid supplied to the inlet to the filter bed for instance by dividing the flow path into several paths passing through a static mixer, said flow paths being joined before reaching the filtration apparatus, or by applying energy to the flowing liquid by means of agitators.

The purification step in accordance with this invention can be used in other separation processes than those described above and shown in the drawings. Moreover, different types of continuously operating filtration apparatus of the bed filter type can be used for purification in accordance with the invention. However, a suitable embodiment of a continuously operating filtration apparatus is shown in FIG. 3.

In the filtration apparatus 1 illustrated in FIG. 3, a particulate filter material is enclosed in a tank having walls 2 and a funnel-shaped bottom 3. The base of the funnel 3 should preferably coincide to conform to the shape of the tank as defined by the walls 2.

Sand is especially suited as a particulate filter material in accordance with the invention. However, other materials, such as plastic granules, or mixtures of several materials, can be used. A mixture of several different grainsize fractions of particulate material can also be used in a continuously operating filter according to the invention. Chemicals of the type mentioned above are mixed with the suspension or emulsion to be filtered ($P_6T$) and the suspension is supplied to the tank 1 through an inlet 4, preferably surrounding the bottom of the tank.

Figure 4:
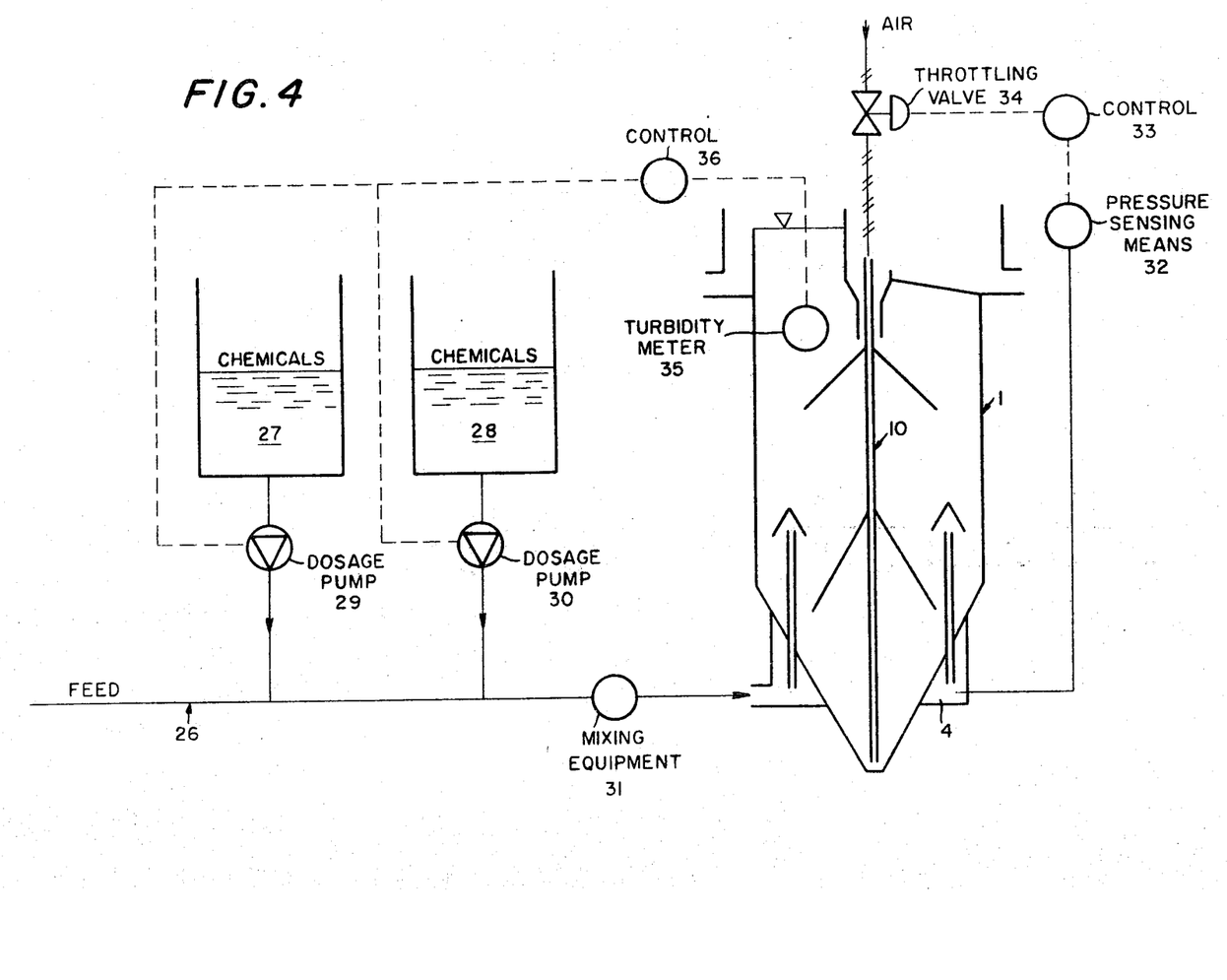
FIG. 4 is a schematic block diagram illustrating a filtering method according to this invention with automatic control of the chemical dosage and of the air that removes filter particles for washing.

A suitable means for supplying chemicals to the liquid to be purified in the particulate filter bed according to the invention is shown in FIG. 4. FIG. 4 also shows a preferred means for controlling the flow of bed material through the transport pipe.

The liquid to be treated is supplied to the filter through pipe 26, at least one type of chemicals being added to the liquid in pipe 26 in a controlled way from at least one tank 27, 28 by use of dosage pumps 29, 30. The chemical additive and the liquid to be treated can preferably be homogenized in some suitable mixing equipment 31 before entering the filter 1.

A turbidimeter 35 or concentration sensor (not shown), placed in the purified liquid, can together with a control instrument 36 be used for controlling the dosage pumps for chemicals addition 29 and 30.

The dosage pumps can in another preferred embodiment be controlled from pressure or volume sensing means (not shown) in the feed pipe 26 or the inlet 4 by use of a control instrument (not shown).

A pressure sensing means 32 or volume sensing means (not shown) controls the supply of air to a transport device 10 (described below) through a control instrument 33 acting on a throttling valve 34 in an air supply pipe of an air lift pump (described below).

The flow of the suspension into the filter bed takes place in the lower part of the filter bed throuh a number of vertical pipes 5 extending upwardly from the inlet 4 and having open pipe mouths 6. A roof 7 is mounted above each pipe mouth in order to prevent the filter material from coming in direct contact with the pipe mouths and in order to expose a larger quantity of the filter material to the suspension supplied through the pipe mouths. In this way, the risk of clogging of the filter bed by substantial immediate soiling of the filter material close to the pipe mouths is reduced. The roofs have a V-shaped cross-section and, owing to this and to the distribution of several pipe mouths within the tank, the downward movement of the filter material is not considerably impeded. The arrangement of the inlet pipe mouths 6 in the lower part of the filter bed provides the advantage that the filter material which is soiled most by the incoming suspension, i.e., the filter material immediately adjacent to the roofs and the pipe mouths, continues downwardly and is not further utilized in the filtration process. In this way, clogging of the inlets is prevented and new, relatively clean, filter material is always exposed to the incoming suspension. The incoming suspension flows upwardly through a zone of the filter bed, in counter-current relation to the motion of the filter material, toward the cleaner filter material. The filtered liquid produced during the upward flow of the suspension through the filter bed zone is maintained and a zone 8 of liquid filtrate above the filer bed and its surface level is, in the illustrated embodiment, established by discharging the filtrated liquid phase from the filtration apparatus over a weir 9 positioned at the top of the tank 2 to an outlet (arrow OW).

At the tank bottom 3, into which the soiled filter material flows, the mouth of a transport device 10 for the filter material is located. As appears from the illustrated embodiment, the transport device extends centrally through the apparatus and can, for instance, consist of an air lift pump having air as the transport medium. The air is supplied from above to the bottom of the device 10 along a pipe 11 which extends alongside a transport pipe 12 forming a part of the transport device and enters the transport pipe 12 through holes (not shown) in the lower part of the pipe. The particulate filter material is transported by the air upwardly (arrow A) through the pipe 12 to a wash device 13, described below more in detail, positioned above the filter bed. if the air injected from the pipe 11 into the lift pump should, for some reason, escape from the lower end of the transport pipe 12 and infiltrate into the filter material, it could produce local fluidizing of the filter material resulting in a substantial reduction of the filtering capacity of the filter. In order to prevent such a disturbance, a funnel 14 turned upside down is positioned around the pump above the mouth at the bottom. The funnel 14 catches any air which may have gone astray and the captured air is drawn through holes near the top of the funnel into a pipe 15 extending alongside the transport pipe. The funnel 14 also serves as guide means for the downward flow of the filter material, so that a uniform flow distribution is obtained over the cross section of the apparatus. The roofs 7 positioned above the inlets 6, as described above, also contribute to achieving the desired uniform flow distribution. In order to provide greater assurance of uniform flow distribution, other roofs 7 (not shown) may be arranged in the filter bed at other appropriate places and without being positioned above inlets for the suspension.

In the wash device 13, which is illustrated on an enlarged scale in FIG. 3, the filter material to be washed is delivered from the upper end of the transport pipe 12, turns (arrow B) and flows downwardly along a wash path formed by the space between the transport pipe 12 and an outer pipe 16. The outer pipe 16 is preferably concentrically arranged relative to the transport pipe 12. Because the filter material is dirty, it may contain aggregates of particles adhering together. To break up any such aggregates, a plate or the like 17 is positioned in the flow path of the filter material, just below the outlet from the transport pipe. The plate 17 also reduces the velocity of the filter particles as they fall from the upper end of the transport pipe. The filter particles thereafter fall through several intermediate partitions 18 provided with holes 19, as they pass downwardly in the wash path. The holes 19 in each pair of adjacent partitions are preferably displaced laterally with respect to each other, so that a free vertical passage for the filter material is prevented. Because of this, the filter particles are decelerated frequently during their passage through the wash device. Througout their passage through the wash device, the filter particles continuously encounter a wash liquid in counter-current flow and at the holes in the intermediate partitions the velocity of the wash liquid becomes instantaneously higher, resuiting in especially favorable conditions for the washing of the filter particles.

In the embodiment shown in FIG. 3, the filtered liquid in the filtrate zone 8 positioned above the filter bed is used as the wash liquid. For this purpose, the wash device is immersed into the filtered liquid in zone 8 and, as shown by the arrow C in the illustrated embodiment, the wash liquid, i.e., the filtered liquid, is supplied to the wash path through the opening 20 between the lower end of the outer pipe 16 and the transport pipe 12 and flows upwardly along the wash path. The wash liquid which becomes dirty during the washing, after flowing through the wash path, passes upwardly from the top of the wash path as shown by the arrow D, flows over a weir 21 and is discharged from the apparatus as shown by the arrow $P_6O$. If desired, the weir 21 can be adjustable in height and width, thereby making it possible to control the quantity of wash liquid withdrawn from the filtrate zone 8. For example, the quantity of wash liquid may be increased by lowering the weir 21. The quantity of wash liquid is also automatically increased with the level of the liquid in the filtrate zone 8 above the filter bed rises, for instance by increased rate of input to the filtration apparatus.

In order to guide the filter material which is discharged from the transport pipe 12 downwardly to the wash path and in order to separate the discharged material from the incoming filter material, a pipe 22 is positioned between the outer pipe 16 and the transport pipe 12, the pipe 22 extending a short distance below the top end of the transport pipe. The pipe 22 projects above the outer pipe 16, and the air supply pipe 11 and the air discharge pipe 15 extend upwardly through the pipe 22. In addition, the pipe 22 contains a device 23 for capturing air containing filter material from the transport pipe 12. In the illustrated embodiment, this capturing device consists of downwardly faced cones and upwardly faced truncated cones, alternatively arranged.

Although not shown in the drawings, a part of the filtered liquid can, if desired, be withdrawn from within the filter bed zone by arranging a series of outlet pipe mouths below the top surface of the filter bed, preferably located substantially vertically above the inlet pipe mouths 6. Moreover, these outlet pipe mouths can preferably be provided with roofs similar to the roofs 7 above the inlet pipe mouths 6. By taking out the filtered liquid through such outlet pipe mouths positioned within the filter bed zone below the top surface thereof, a satisfactory filtered liquid may be obtained in the even of a shutdown of the wash device which might cause the filtered liquid above the filter bed to be dirty.

Below the bottom of the wash device, a cone 24 is positioned around the transport pipe for distributing the filter material coming from the wash device evenly across the top surface of the filter bed. For this purpose, the cone 24 is provided with a suitable number of holes 25 in order to provide a supply of filter particles to various parts of the surface of the filter bed positioned below the cone.

In addition to the above-described automatic control of the wash liquid quantity, an automatic control of the quantity of filter medium supplied to the wash can be accomplished, if desired. By placing a volume sensing or pressure sensing means (not shown) in the inlet pipe for the suspension, a signal indicating a change, for instance a pressure increase owing to accumulation of suspended material in the filter bed, can be obtained. This signal can be used in a conventional manner to control the flow rate of the transport device 10, so that the quantity of filter material transported to the wash device is increased or decreased.

In the embodiment described above and illustrated in the drawings, the wash device is immersed in the zone 8 of filtrated liquid phase and the filtered liquid is withdrawn from that zone into the wash device through the opening 20 for use as a wash liquid. If desired, however, the filtered liquid utilized for washing of filter particles can be received laterally through one or more openings in the outer pipe 16 at the lower portion thereof. In another alternative embodiment, not shown, in which filtered liquid from the zone 8 is also utilized as wash liquid, at least a part of the wash device is immersed into but isolated from the filter bed and one or more pipes extend from the zone 8 to the lower portion of the wash device for the supply of the wash liquid to the wash device so positioned.

The filtration aparatus 1 described herein and illustrated in the drawings permits a construction having relatively small dimensions and thereby provides the advantage that the apparatus is easy to handle and easy to attend in operation. Moreover, owing to the fact that all elements required for the continuously operating apparatus are positioned within the apparatus and furthermore that certain devices, for instance the wash device and the transport device, can be formed as units, the apparatus is well adapted to be built as module. When greater filtration capacities are required than can be provided by a single apparatus, it is possible to combine several filtration apparatus into one large filtration plant in a simple and advantageous way because of the relatively small size of the apparatus.

We claim:

1. In a method for filtering wherein liquid comprising a suspension or emulsion to be filtered is supplied to a zone of particle filter medium forming a filter bed, the liquid being filtered flows, during the filtration thereof, in an upward direction through the filter bed and is discharged from the filter bed as filtrated liquid phase, and wherein the filter medium during the filtration flows in a downward direction through the filter bed in counter-current to the liquid being filtered, past the inflow of the liquid and thereafter is transported separated from the filter bed to a wash path for washing the dirty filter medium during flow along the wash path in counter-current to a wash liquid, whereupon the washed filter medium is returned to the filter bed zone to its top surface, at least a part of the filtrated liquid phase which is discharged from the filter bed zone is maintained above this zone as a zone of filtrated liquid phase in direct contact with the filter bed zone, and said counter-current washing of the dirty filter medium along the wash path takes place during flow of the dirty filter medium in counter-current to a portion of said filtrated liquid phase utilized as wash liquid, said portion of said filtrated liquid phase being supplied to the wash path from said zone of filtrated liquid phase, the improvement comprising adding to the liquid to be filtered chemicals facilitating at least one of the processes of precipitation and flocculation, continuously directing the liquid containing the chemicals from the chemical addition location directly to a zone of moving particulate filter material forming the filter bed, absent intermediate passage through any flocculation tank and absent intermediate passage through any sedimentation basin, passing the liquid containing the chemicals through the filter bed to provide at least one of the precipitation and flocculation processes within the moving particulate material of the bed.

2. A method according to claim 1, including the step of homogenizing the liquid and the chemical before the liquid is supplied to the filter bed.

3. A method according to claim 2, wherein the homogenizing is accomplished by dividing the liquid flow into separate flow paths and rejoining the liquid flow before passing the liquid into the filter bed.

4. A method according to claim 2, wherein the homogenizing is accomplished by applying energy to the liquid.

5. A method according to claim 1, wherein a part of the soiled wash liquid is returned to the filtering process.

6. A method according to claim 5, wherein the soiled wash liquid is supplied to a treatment process for sludge material separated from the liquid in the filtering process, said treatment process being carried out in parallel with the filtering process.

7. A method according to claim 6, wherein a part of the soiled liquid being treated in the treatment process is the liquid that is returned to the filtering process.

8. A method according to claim 1, including the step of causing the relative velocity between the filter particles and the wash liquid to be increased instantaneously at least once during the washing of said filter particles.

9. A method according to claim 1, wherein the flow velocity of the filter particles is decelerated at least once during the washing of said filter medium.

10. A method according to claim 1, wherein the deceleration of the filter particles is followed by the instantaneous increase in relative velocity of the filter particles and the wash liquid.

11. In the method according to claim 1, an improved liquid purification step comprising monitoring at least one operating characteristic of the filter, and controlling the dosage of the chemicals added to the liquid in said step of adding chemicals responsive to the characteristic monitored.

12. The method according to claim 11, wherein the step of continuously removing soiled particles includes supplying air to lift the soiled particles upwards apart from and through the bed to a particle washing means, sensing at least one of the operating characteristics of the filter and controlling the air supply responsive to that at least one characteristic.

13. In a process for separating pollutants from a liquid, an improved liquid purification step, wherein pollutants are assembled and separated from the liquid, comprising adding to the liquid to be filtered chemicals facilitating at least one of the processes of precipitation and flocculation, continuously directing the liquid containing the chemicals from the chemical addition located directly to a zone of moving particulate filter material forming a filter bed, absent intermediate passage through any flocculation tank and absent intermediate passage through any sedimentation basin, passing the liquid containing the chemicals through the filter bed to provide at least one of the precipitaton and flocculation processes within the moving particulate material of the bed, moving the particulate material of the filter bed relative to the liquid and in addition to the movement of the liquid, removing soiled particulate material and pollutants from the filter bed, cleaning the particulate material, and returning the particulate material to the filter bed, said steps of removing, cleaning and returning the particulate material being simultaneous with the passing of liquid through the filter bed and including the step of supplying air to transport soiled filter particles from the filter bed to a wash path for said step of cleaning.

* * * * *

UNITED STATES PATENT AND TRADEMARK OFFICE
CERTIFICATE OF CORRECTION

PATENT NO. : 4,246,102
DATED : January 20, 1981
INVENTOR(S) : Ulf R. Hjelmner and Hans F. Larsson It is certified that error appears in the above—identified patent and that said Letters Patent is hereby corrected as shown below:

First page, Item [30], "76133677" should read -- 7613367-7 ;
Col. 3, line 6, "$P_{1-6}$" should read -- $P_1 - P_6$ --;
Col. 5, line 61, "and" should read -- as --;
Col. 5, line 62, "filer" should read -- filter --;
Col. 6, line 11, "if" should read -- If --;
Col. 6, line 54, "Througout" should read -- Throughout --;
Col. 7, line 12, "with" should read -- when --;
Col. 7, line 40, "even" should read -- event --;
Col. 8, line 10, "aparatus" should read -- apparatus --; and
Col. 10, line 20, "precipitaton" should read --precipitation--;

Signed and Sealed this

Thirtieth Day of June 1981

[SEAL]

Attest:

RENE D. TEGTMEYER

*Attesting Officer*  *Acting Commissioner of Patents and Trademarks*

REEXAMINATION CERTIFICATE (2550th)

United States Patent [19]

Hjelmnér et al.

[11] B1 4,246,102

[45] Certificate Issued *May 2, 1995

[54] METHOD FOR SEPARATING POLLUTANTS FROM LIQUID

[75] Inventors: Ulf R. Hjelmnér, Nynäshamn; Hans F. Larsson, Vasterhaninge, both of Sweden

[73] Assignee: Rederiaktiebolaget Nordstjernan, Stockholm, Sweden

Reexamination Requests:
No. 90/002,817, Aug. 14, 1992
No. 90/002,496, Oct. 31, 1991

Reexamination Certificate for:
Patent No.: 4,246,102
Issued: Jan. 20, 1981
Appl. No.: 855,323
Filed: Nov. 28, 1977

[*] Notice: The portion of the term of this patent subsequent to Nov. 20, 1995 has been disclaimed.

Certificate of Correction issued Jun. 30, 1981.

[30] Foreign Application Priority Data
Nov. 29, 1976 [SE] Sweden .................. 76133677

[51] Int. Cl.$^6$ ................................. B01D 24/46
[52] U.S. Cl. .......................... 210/704; 210/96.1; 210/723; 210/739; 210/765; 210/786; 210/793; 210/798

[56] References Cited

U.S. PATENT DOCUMENTS

| | | | |
|---|---|---|---|
| 2,057,887 | 10/1936 | Elliott et al. | 210/80 |
| 4,060,484 | 11/1977 | Austin et al. | 210/80 |
| 4,126,546 | 11/1978 | Hjelmner et al. | 210/19 |

FOREIGN PATENT DOCUMENTS

| | | |
|---|---|---|
| 2262599 | 7/1973 | Germany . |
| 728554 | 11/1972 | South Africa . |

OTHER PUBLICATIONS

"State of the Art of Water Filtration" article prepared by the AWWA Commission on Filtration Problems in Journal AWWA, Oct., 1972, pp. 662–665.

James C. Brown and Daniel A. Okun, "European Practice in Water Filtration" in Proceedings of the Conference on Water Filtration, Apr. 7, 1965, Rolla, Missouri, pp. 55–78.

*Primary Examiner*—Ivars C. Cintins

[57] ABSTRACT

In the particular embodiment of the invention described in the specification, a liquid to be purified passes first through a screen, a sand trap, a first sedimentation basin, an aeration basin and a second sedimentation basin, and then through a final purification step for chemical admixture and passage upwardly through a particulate filter bed. The particulate filter material is circulated continuously from the bottom of the filter bed through a washing device and the cleaned particulate material is deposited at the top of the filter bed. Sludge collected from the sedimentation basins and the washing device is treated in thickeners and digesters.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–12 is confirmed.

Claim 13 is determined to be patentable as amended.

13. In a process for separating pollutants from a liquid, an improved liquid purification step, wherein pollutants are assembled and separated from the liquid, comprising adding to the liquid to be filtered chemicals facilitating at least one of the processes of precipitation and flocculation, continuously directing the liquid containing the chemicals from the chemical addition [located] *location* directly to a zone of moving particulate filter material forming a filter bed, absent intermediate passage through any flocculation tank and absent intermediate passage through any sedimentation basin, passing the liquid containing the chemicals *upwardly* through the filter bed to provide at least one of the precipitation and flocculation processes within the moving particulate material of the bed, moving the particulate material of the filter bed *downwardly* relative to the liquid and in addition to the movement of the liquid, *maintaining a zone of filtrate above the filter bed in direct contact with the filter bed,* removing soiled particulate material and pollutants from the filter bed, cleaning the particulate material *using filtrate from the zone of filtrate above the filter bed,* and returning the particulate material to the *top of the* filter bed, said steps of removing, cleaning and returning the particulate material being simultaneous with the passing of liquid through the filter bed and including the step of supplying air to transport soiled filter particles from the filter bed to a wash path for said step of cleaning.

* * * * *